US009324299B2

(12) United States Patent
Blanco et al.

(10) Patent No.: US 9,324,299 B2
(45) Date of Patent: Apr. 26, 2016

(54) ATLASING AND VIRTUAL SURFACES

(75) Inventors: Leonardo E. Blanco, Redmond, WA (US); Silvana Patricia Moncayo, Seattle, WA (US); Hang Li, Seattle, WA (US); Mary Luo, Redmond, WA (US); Imran Majid, Redmond, WA (US); Joshua Warren Priestley, Redmond, WA (US); Benjamin C. Constable, Redmond, WA (US); Anuj B. Gosalia, Sammamish, WA (US); Aleksandar Antonijevic, Bellevue, WA (US); Daniel N. Wood, Seattle, WA (US); Max McMullen, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 68 days.

(21) Appl. No.: 13/229,629

(22) Filed: Sep. 9, 2011

(65) Prior Publication Data

US 2013/0067502 A1    Mar. 14, 2013

(51) Int. Cl.
*G06T 11/40* (2006.01)
*G06F 9/46* (2006.01)
*G09G 5/14* (2006.01)
*G06F 3/14* (2006.01)
*G09G 5/393* (2006.01)
*G09G 5/397* (2006.01)

(52) U.S. Cl.
CPC .. *G09G 5/14* (2013.01); *G06F 3/14* (2013.01); *G09G 5/393* (2013.01); *G09G 5/397* (2013.01); *G06T 11/40* (2013.01)

(58) Field of Classification Search
CPC ......... G06T 11/40; G06T 11/001; G06T 1/60; G06T 3/40; G09G 2360/122; G09G 2310/04; G06F 17/30244; G06F 17/30902
See application file for complete search history.

(56) References Cited

U.S. PATENT DOCUMENTS

| 7,239,324 B2 | 7/2007 | Wilt et al. |
| 2002/0029226 A1* | 3/2002 | Li et al. .................. 707/104.1 |
| 2007/0013708 A1* | 1/2007 | Barcklay et al. ............. 345/557 |
| 2007/0124474 A1* | 5/2007 | Margulis ...................... 709/226 |
| 2007/0132770 A1* | 6/2007 | Stefanidis et al. ............ 345/541 |
| 2008/0010273 A1* | 1/2008 | Frank ................................. 707/5 |

(Continued)

FOREIGN PATENT DOCUMENTS

WO    WO-2011/052117 A1 *  5/2011

OTHER PUBLICATIONS

"What Is a Swap Chain? (Direct3D 9)", Retrieved at <<http://msdn.microsoft.com/en-us/library/bb206356.aspx>>, Jun. 21, 2011, pp. 2.

(Continued)

*Primary Examiner* — Tize Ma
(74) *Attorney, Agent, or Firm* — Tim Churna; Kate Drakos; Micky Minhas

(57) ABSTRACT

Atlasing and virtual surface techniques are described. In one or more implementations, virtual surface functionality is exposed by an operating system for access by one or more applications of the computing device. A virtual surface is created in response to a request from the one or more applications to be used to render visuals for display by a display device. The virtual surface is allocated in memory of the computing device by the exposed virtual surface functionality to have an area that is larger than an area to be used to display the visuals from the one or more applications.

20 Claims, 8 Drawing Sheets

(56) References Cited

U.S. PATENT DOCUMENTS

| | | | |
|---|---|---|---|
| 2008/0122852 A1* | 5/2008 | Noyle et al. | 345/520 |
| 2010/0040297 A1* | 2/2010 | Ohba et al. | 382/232 |
| 2011/0157189 A1 | 6/2011 | Diard | |
| 2012/0268465 A1* | 10/2012 | Inada | 345/428 |

OTHER PUBLICATIONS

Eckert, R., "DirectX and Windows Game Programming", Retrieved at <<http://www.cs.binghamton.edu/~reckert/360/class4x.htm>>, 2000, pp. 3.

Brandon., "Rendering Framework: GDI via C#", Retrieved at <<http://bmoretz.wordpress.com/2011/01/21/rendering-framework-gdi-via-c/>>, Jan. 21, 2011, pp. 8.

Beets, Kristof., "Developing 3D Applications for PowerVR MBX Accelerated ARM Platforms", Retrieved at <<http://www.iqmagazineonline.com/magazine/pdf/v_4_3_pdf/v_4_3_pg-26-34.pdf>>, Information Quaterly, vol. 4, No. 3, pp. 26-34.

Walbourn, Chuck., "Graphics APIs in Windows", Retrieved at <<http://msdn.microsoft.com/en-us/library/ee417756.aspx>>, Mar. 2008, pp. 5.

Ackermann, et al., "Combining 2D User Interface Components and Interactive 3D Graphics in ET++", Retrieved at <<http://citeseerx.ist.psu.edu/viewdoc/download?doi=10.1.1.48.1669&rep=rep1&type=pdf>>, International Conference on Technology of Object-Oriented Languages and Systems, 1993, pp. 13.

"Direct3D 9Ex Improvements", Retrieved at <<http://msdn.microsoft.com/en-us/library/ee890072.aspx>>, Retrieved Date: Sep. 2, 2011, pp. 16.

* cited by examiner

ATLASING AND VIRTUAL SURFACES

BACKGROUND

The variety of computing device configurations continues to increase. From traditional desktop personal computers to mobile phones, game consoles, set-top boxes, tablet computers, and so on, the functionality available from each of these configurations may vary greatly.

Consequently, traditional display techniques that were developed for one configuration may not be as well suited for another configuration. For example, display techniques that were previously utilized for devices having significant memory resources may be ill-suited for devices having fewer resources.

SUMMARY

Atlasing and virtual surface techniques are described. In one or more implementations, virtual surface functionality is exposed by an operating system for access by one or more applications of the computing device. A virtual surface is created in response to a request from the one or more applications to be used to render visuals for display by a display device. The virtual surface is allocated in memory of the computing device by the exposed virtual surface functionality to have an area that is larger than an area to be used to display the visuals from the one or more applications.

In one or more implementations, a computing device comprises one or more modules implemented at least partially in hardware and configured to implement an operating system to expose one or more applications programming interfaces for access by one or more applications to update visuals to be rendered for display by a display device. The application programming interfaces (APIs) include a begin draw application programming interface (API) that is configured to accept a size and offset of a portion of a logical surface that is to be updated and a suspend draw application programming interface (API) that is configured to suspend an update that is to be performed for the portion of the logical surface. The application programming interfaces (APIs) also include a resume draw application programming interface (API) that is configured to access the portion of the logical surface from a suspended state to continue an update and an end draw application programming interface (API) that is configured to indicate an end of the update to the operating system.

In one or more implementations, one or more computer-readable storage media comprising instructions stored thereon that, responsive to execution by a computing device, causes the computing device to implement an operating system that comprises an allocator module configured to manage distribution and positioning of logical surfaces inside of an atlas, each the logical surfaces configured to include one or visuals received from an application for rendering, and an update manager module to manage allocation and reconciliation of updates, received from the application, with a surface allocation to be rendered for display by a display device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Applications traditionally created windowless swap chains that involved a front and back buffer that was associated with each visual, which could result in an inefficient use of resources of a computing device when used alone. For example, an application using these traditional techniques may utilize six different buffers (e.g., texture video memory) to update three different visuals. This inefficiency could be exacerbated in scenarios that could involve significant numbers of visuals that are to animate at once or in response to a user input such as a tile deletion, panning, or zooming scenario. In such scenarios, a start-up cost in terms of computing device resources to create the shared surfaces plus the swap chains may become prohibitive as the number of elements to be animated increases. This could result in slow or delayed animation and lags in response time for the end user.

Atlasing and virtual surface techniques are described herein. In one or more implementations, these techniques may be used to reduce resource usage of a computing device to render visuals. For example, these techniques may be used to reduce memory consumption as well as a number of surfaces created for an application to achieve an animation and composition scenario, which may be accomplished through atlasing. These techniques may also be used to enable applications to break surfaces of content into tiles and render the tiles ahead of time, which may be accomplished through use of virtual surfaces. Further discussion of atlasing and virtual surfaces may be found in relation to the following sections.

In the following discussion, an example environment is first described that is operable to perform the atlasing and virtual surface techniques described herein. Examples procedures are then described, which are operable in the example environment as well as in other environments. Likewise, the example environment is not limited to performance of the example procedures.

Example Environment

Figure 1:
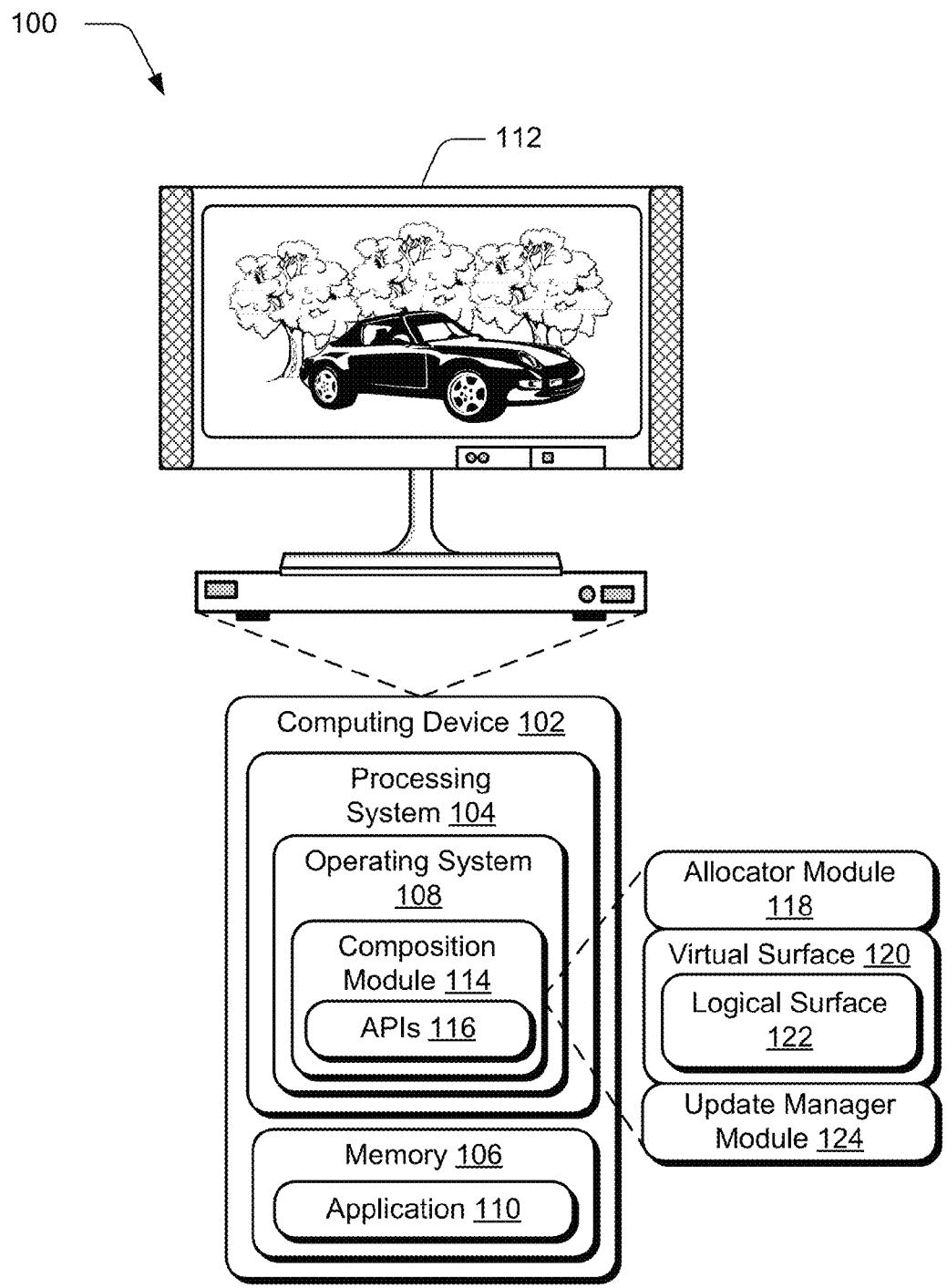
FIG. 1 is an illustration of an environment in an example implementation that is operable to perform atlasing and virtual surface techniques described herein.

FIG. 1 illustrates an operating environment in accordance with one or more embodiments, generally at 100. Environment 100 includes a computing device 102 having a processing system 104 that may include one or more processors, an example of computer-readable storage media illustrated as memory 106, an operating system 108, and one or more applications 110. Computing device 102 can be embodied as any suitable computing device such as, by way of example and not limitation, a desktop computer, a portable computer, a handheld computer such as a personal digital assistant (PDA), mobile phone, tablet computer, and the like. Different examples of a computing device 102 is shown and described below in FIGS. 7 and 8.

The computing device 102 also includes an operating system 108 that is illustrated as being executed on the processing system 104 and is storable in memory 106. The computing device 102 further includes applications 110 that are illustrated as being stored in the memory 106 and are also executable on the processing system 104. The operating system 108 is representative of functionality of the computing device 102 that may abstract underlying hardware and software resources for use by the applications 110. For example, the operating system 108 may abstract functionality of how data is displayed on the display device 112 without the applications 110 having to "know" how this display is achieved. A variety of other examples are also contemplated, such as to abstract the processing system 104 and memory 106 resources of the computing device 102, network resources, and so on.

The computing device 102 is also illustrated as including a composition module 114. Although illustrated as part of the operating system 108, the composition module 114 may be implemented in a variety of ways, such as a stand-alone module, as a separate application, as part of hardware of the computing device 102 itself (e.g., a SOC or ASIC), and so on. The composition module 114 may employ a variety of techniques to render visuals, such as to expose functionality via one or more application programming interfaces (APIs) 116 for use by the applications 110 to render visuals.

For example, one such technique may be based on an object called a swap chain, which may leverage an array of buffers representing a bitmap. One of the buffers, for instance, may be used to present data on the display device 112 at any one time and therefore may be called the "onscreen buffer" or "front buffer." The other buffers are made available to an application 110 for rasterization off screen and therefore may be referred to as an "off-screen buffer" or "back buffer."

An application 110 may make a change to what is displayed on the display device 112 in a variety of ways. In a first such technique, the application 110 can redraw one of the back buffers and "flip" the contents, such as by making one of the off-screen buffers the onscreen buffer using a pointer and vice versa.

In a second such technique, buffers of different sizes may also be leveraged. For example, the composition module 114 may leverage a first buffer as an onscreen buffer. The composition module 114 may also leverage a second buffer that is smaller than the first buffer as an off-screen buffer. Therefore, when an update is to be made to the content, the update may be rasterized to the second buffer. The update may then be copied to the onscreen buffer, e.g., using a blt. In this way, resources of the computing device 102 may be conserved.

The composition module 114 may also be configured to support atlasing and virtual surface techniques. These techniques may be used to assist developers of the applications 110 to reduce resources of the computing device 102 that are used to render visuals. This may include atlasing, which may be used to reduce memory 106 consumption, e.g., by decreasing a number of surfaces created for the application 110 to achieve an animation and composition scenario. This may also include use of virtual surfaces, thereby enabling applications 110 to break a surface of visual data into tiles and then render the tiles ahead of time.

Atlasing may be implemented using a variety of functionality, illustrated examples of which include an allocator module 118, a virtual surface 120 having one or more logical surfaces 122, and an update manager module 124. The allocator module 118 is representative of functionality to act as an "atlas packing mechanism" to manage the distribution and positioning of logical surfaces 122 inside of an atlas, including memory 106 compaction and reuse, as well as the creation and destruction of additional atlas surfaces as desired.

A virtual surface may be configured as a collection of one or more logical surfaces 122. The logical surface 122 is representative of an individual surface as seen by the application 110 and may be associated with one or more visuals. The logical surface 122, for instance, may be configured as tiles having a fixed size and a plurality of which may be arranged in a fixed grid, although it should be readily apparent that a variety of other instances are also contemplated.

A virtual surface 120 may be built on top of one or more physical atlas surfaces. Additionally, the virtual surface may be used to represent an area that is larger than an area represented by a texture. For example, the application 110 may specify a size of a virtual texture at creation time. The size establishes the boundaries for the virtual surface. The surface can be associated with one or multiple visuals. In one or more implementations, when a virtual surface is first initialized, it is not backed by actual allocations. In other words, the virtual surface 120 may not "hold bits" upon initialization but may do so at a later point in time.

The update manager module 124 is representative of functionality of the composition module 114 to manage allocation of update regions and reconciliation of updates with a final surface allocation. The update manager module 124, for instance, may be employed to perform synchronous as well as asynchronous updates, further discussion of which may be found in relation to the following figures.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the atlasing and virtual surface techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

In the following discussion, a visual may refer to a basic composition element. For example, a visual may contain a bitmap and associated compositional metadata for processing by the composition module 114. A visual's bitmap can be associated with a swap chain (e.g., for dynamic content such as video) or an atlas surface (e.g., for semi-dynamic content). The two presentation models may be supported in a single visual tree that is supported by the composition module 114.

For semi-dynamic content, an atlas serves as the updating model for the visual's bitmap and may refer to an aggregate layer which may include a plurality of layers to be rendered, although a single layer is also contemplated. The visual and its property manipulations (e.g. offset, transform, effect, and so on) as well as the methods to update the visual's atlas-based-bitmaps (BeginDraw, SuspendDraw, ResumeDraw, EndDraw) are exposed via application programming interfaces, whereas the atlas layer size, tiles size, packing/compaction/management of bitmap updates is completely hidden from the application. This guarantees we can make the appropriate tradeoffs to rich better performance.

A swap chain refers to a series of buffers that may "flip" to the screen on after another, such as by changing pointers. Accordingly, a flip mode is a mode by which a swap chain technique is used to make an off-screen buffer an onscreen buffer, e.g., through the use of swapping points between the off-screen and onscreen buffers. However, a blt mode refers to a technique in which a runtime of the composition module 114 issues a "blt" (e.g., bit block image transfer) from an off-screen buffer to an onscreen buffer, which may be used to update the onscreen buffer. An example implementation using these terms is now discussed.

Allocator Module 118

Figure 2:
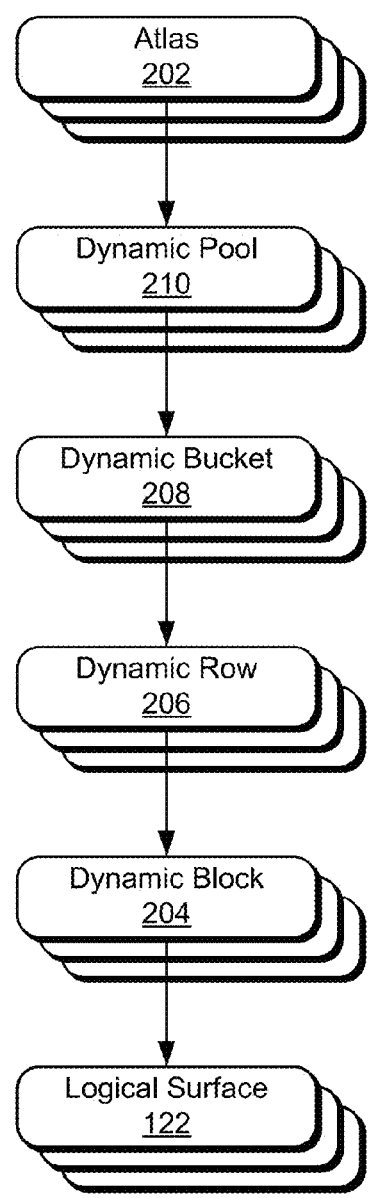
FIG. 2 depicts an example embodiment showing objects and corresponding relationships that may be managed by an allocator module of FIG. 1.

FIG. 2 depicts an example embodiment 200 showing objects and corresponding relationships that may be managed by the allocator module 118 of FIG. 1. The allocator module 118 may be configured to provide a variety of management functionality as described earlier. For example, the allocator module 118 may be configured to manage four sets of objects for an atlas 202. One such set of objects is a dynamic block 204, which may be defined as a rectangle in an atlas surface 202 and may map "one-to-one" to a logical surface 122. It should be readily apparent that a wide variety of other shapes for the portion defined by the dynamic block 204 are also contemplated.

Another set of objects involves a dynamic row 206, which may be defined as a horizontal slice of an atlas 202. In one or more implementations, the dynamic row 206 may be configured to contain one or more dynamic blocks 204 of the same height but may have the same or different widths. Naturally, other implementations are also contemplated in which different heights and the same widths are also contemplated, different heights and widths, and so on.

A further set of objects is illustrated as a dynamic bucket 208. In one or more implementations, the dynamic bucket 208 may refer to a collection of dynamic rows 206 having a matching height. Again, other implementations are also contemplated in which different heights may also be addressed.

Yet another set of objects refers to a dynamic pool 210. In one or more implementations, a dynamic pool 210 may refer to a collection of dynamic buckets 208 and map "one-to-one" to an atlas 202 surface. Again, other implementations are also contemplated.

In one or more examples, the allocator module 118 may be configured to break up the atlas 202 into rows, which may be further broken down into blocks. Accordingly, in this example the blocks in a row have a matching height, which may be used to facilitate compaction and reuse of the memory 106. Additionally, multiple rows having a matching height may be efficiently managed together, e.g., as it may be efficient to manage compaction across similar rows.

The allocator module 118 may perform a variety of functions, including allocation, de-allocation, and compaction. In regards to allocation, when a logical surface 122 is created, the allocator module 118 may locate an appropriate dynamic row 206 that "has room" for the corresponding dynamic block 204. Once located, the allocator module 118 may mark the memory 106 as "in use." If a dynamic row 206 is not available, the allocator module 118 may attempt to create a new dynamic row 206 in an existing atlas 202. If there is not enough space in the existing atlas 202, the allocator module 118 may attempt to create a new atlas.

Regarding de-allocation, when a logical surface 122 is deleted, the allocator module 118 may marks respective portions of the memory 106 as reclaimable. However, reclamation of this portion of memory 106 may wait until later, e.g., until memory 106 is desired for use in re-allocation.

Regarding compaction, when there is insufficient space in the memory 106 for a logical surface 122 allocation, the allocator module 118 may attempt to "compact" current usage of the memory 106. For example, the allocator module 118 may attempt to reclaim unused memory 106 and move existing allocations around (e.g., to different addresses in the memory) in an attempt to free up enough contiguous memory to satisfy the new allocation before allocating a new row or a new atlas.

Logical Surface 122 Management

The composition module 114 may expose an object (e.g., "IDCompositionSurface") as a logical representation of a region on a physical atlas surface. The composition module 114 may also expose APIs 116 that are accessible for the application 110 to create, update, and delete these logical surfaces. Each surface may be associated with one or more visuals.

Figure 3:
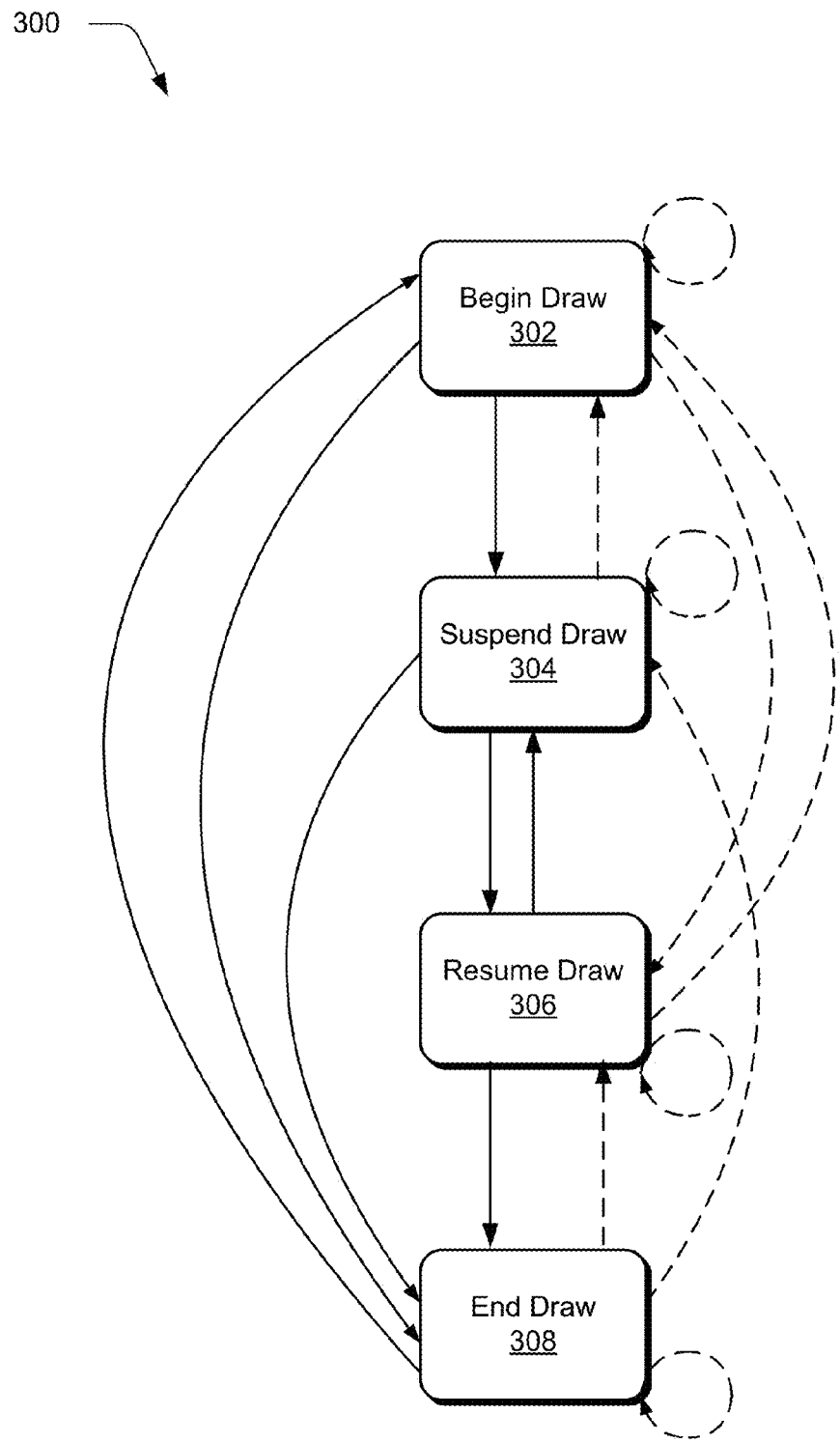
FIG. 3 depicts a flow chart that illustrates an example of the different paths a developer of the application may attempt to access APIs and which paths are or are not supported by a composition module of FIG. 1.

FIG. 3 depicts a flow chart 300 that illustrates an example of the different paths a developer of the application 110 may attempt to access APIs and which paths are or are not supported by the composition module 114. Illustrated operations exposed via respective APIs include begin draw 302, suspend draw 304, resume draw 306, and end draw 308. Supported paths are illustrated through the use of solid lines in the figure and paths that are not support are illustrated using dashed lines in the figure.

An application 110, for instance, may update a logical surface 122 by calling begin draw 302 and by passing a size and offset of a rectangle on the logical surface that is to be updated. The composition system 114 may then allocate and enforce a rectangle of the specified size on the physical atlas and return the atlas surface and the corresponding offset to be used to draw/update to the calling application 110.

More than one pending update may be involved with the application 110. In one or more implementations, to support this scenario the application 110 calls suspend draw 304 on a first surface. This is performed before calling begin draw 302 for a second surface or resume draw 306, e.g., to go back to a suspended surface. End draw 308, as the name implies, refers to an end of the update. In one or more implementations, suspend draw 304 is not used to present or discard the content, rather the end draw 308 operation is used through calling the respective API.

Update Manager Module 124

The update manager module 124 of the composition module 114 may make a logical distinction between two types of atlases, e.g., an update atlas and a texturing atlas. The update atlas may be used as a scratch surface, e.g., a surface returned to the application 110 when begin draw 302 or resume draw 306 is called to make updates. A texturing atlas, on the other hand, is an atlas from which the composition module 114 may apply textures.

The update manager module 124 of the composition module 114 may process updates using a variety of different techniques. This may be determined by the update module 124, for instance, by using heuristics. Examples of such techniques include synchronous updates and asynchronous updates as described below.

Synchronous Updates

In this model, changes made to an update atlas are copied to a texturing atlas (e.g., using a blt operation) for consumption by the composition module 114. The copy may be initiated responsive to a call made to "commit" by the application 110. When the application 110 is done generating the update, the application 110 may call "commit." In response, the composition module 114 may execute a series of copy operations (e.g., blt's) to copy updated content from the update atlas to the texturing atlas. The composition module 114 may also issue a "present" call at the time of commit to synchronize bitmap updates with visual changes, i.e., transactional synchronization.

Asynchronous Updates

In this model, the composition module 114 may maintain a hybrid atlas that includes both an update and texture surface. Additionally, the application 110 and the composition module 114 may have read/write access to different regions of the surface at the same time. The composition module 114 may manage the state of this hybrid atlas, e.g., to ensure an updatable region is not a potential source for texturing.

There are a variety of different scenarios for which an asynchronous update may be used. One such scenario involves whether an update affects a totality of a logical surface area. In this case, the composition module 114 may give the application 110 a new logical surface on the texturing atlas such that the update may be made directly to the texturing surface without using a copy operation, e.g., a blt.

Another such scenario involves whether an update affects a majority of a logical surface. For example, the majority may be defined as more than two thirds of an area of a logical surface 122. In this case, the composition module 114 may allocate a new logical surface on a texturing atlas and return to the application 110 a portion (e.g., sub-rectangle) of the new surface that is to be used to make updates. In addition, the composition module 114 may execute a copy operation (e.g., blt) to copy over unchanged areas from the old surface to the new one.

A further such scenario involves whether an update affects a minor part of a logical surface. In this case, a copy operation (e.g., blt) may be issued except that the portion (e.g., sub-rectangle) returned to the application 110 may be on the same texturing surface, e.g., depending on a cost of same-surface copy operations.

Virtual Surface 120

As previously described, when a virtual surface 120 is first initialized in one or more implementations, it is not backed by actual allocations. In other words, it does not "hold any bits." The composition module 114 may perform allocation of tiles (i.e., composition surface objects) once the application 110 starts updating the surface. Similar to atlasing, the application 110 can update the virtual surface 120 via the begin draw 302, suspend draw 304, resume draw 306, and end draw 308 API calls to respective operations. The mapping may be determined by an internal atlasing algorithm of the composition module 114 and is not made visible to the application 110 in one or more implementations.

Additionally, the composition module 114 may expose functionality via APIs 116 to enable applications 110 to resize and trim a virtual surface 120. For example, a resize operation may be used to change the boundaries of the virtual surface 120. This means that new updates and/or allocations are to fall within the boundaries set by the new size. The application 110 may also use this method to inform the composition module 114 that a certain region of the virtual surface 120 is no longer being utilized and thus is available for reclamation. If the resize results in shrinking the area, the application 110 is no longer be able to make updates to the regions outside of the new boundaries through management by the composition module 114.

Figure 4:
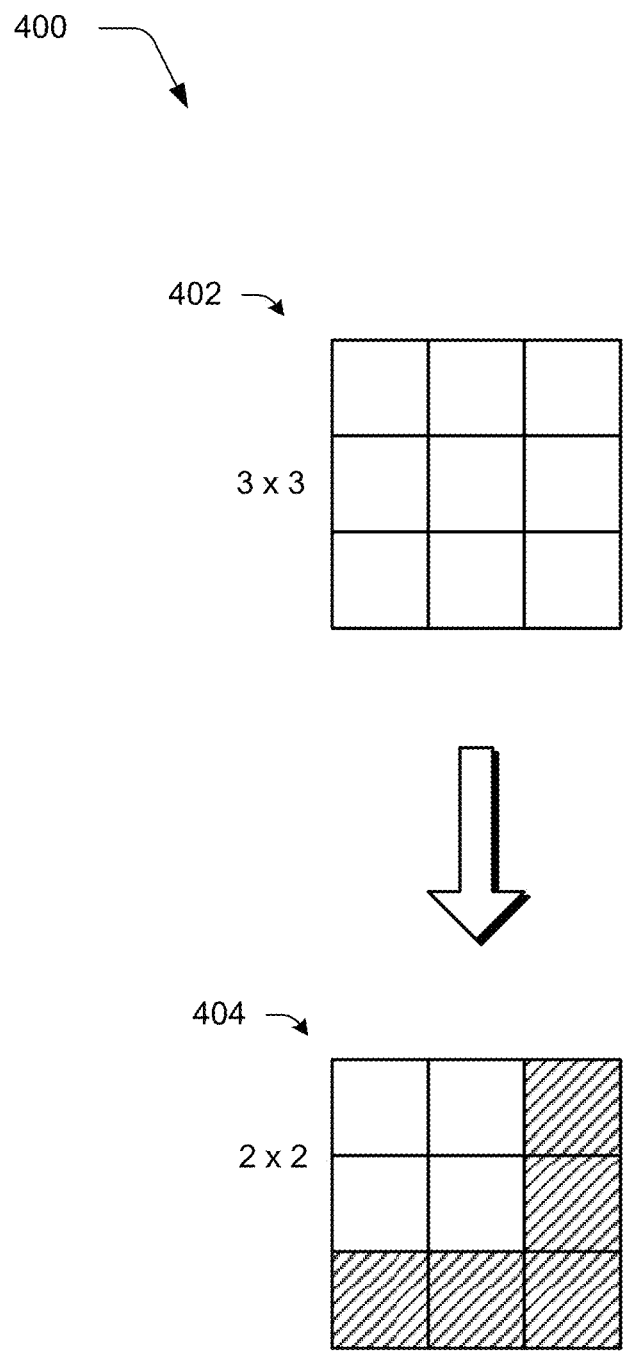
FIG. 4 depicts an example implementation in which a virtual surface is resized.

FIG. 4 depicts an example implementation 400 in which a virtual surface is resized. In the illustrated example, first and second stages 402, 404 are used to show that a 3×3 virtual surface is resized to 2×2, respectively. The regions that contain cross-hatching in the second stage 404 represent tiles that are to be discarded as part of the resize operation. As mentioned before, the memory 106 used to store these tiles may then be reclaimed by the composition module 114. After the resize, the application 110 will no longer be able to make updates to the discarded region (i.e., the cross-hatched region) without first resizing the virtual surface again.

Additionally, the resize operation may be initiated by the composition module 114 in response to receipt of indication of the operation in one or more implementations. For example, the composition module 114 may implement resize updates upon receipt of the indication without waiting for the application to call "commit." For example, an application may call "Resize(0, 0)," "Resize(INT_MAX, INT_MAX)," and "Commit( )" In this example, the application 110 has caused the content to be discarded on the first resize, so the second resize does not have an effect even though it was called before "Commit( )" In this case, the display device 112 does not display content as none is available for display.

A trim operation may be used to describe a region of a virtual atlas 120 to the composition module 114 that is requested by the application 110. Thus, the trim operation may be performed without resizing boundaries of the virtual surface 120. However, it does tell the composition engine 114 which logical surfaces are to be allocated at present, an example of which is described in relation to the following figure.

Figure 5:
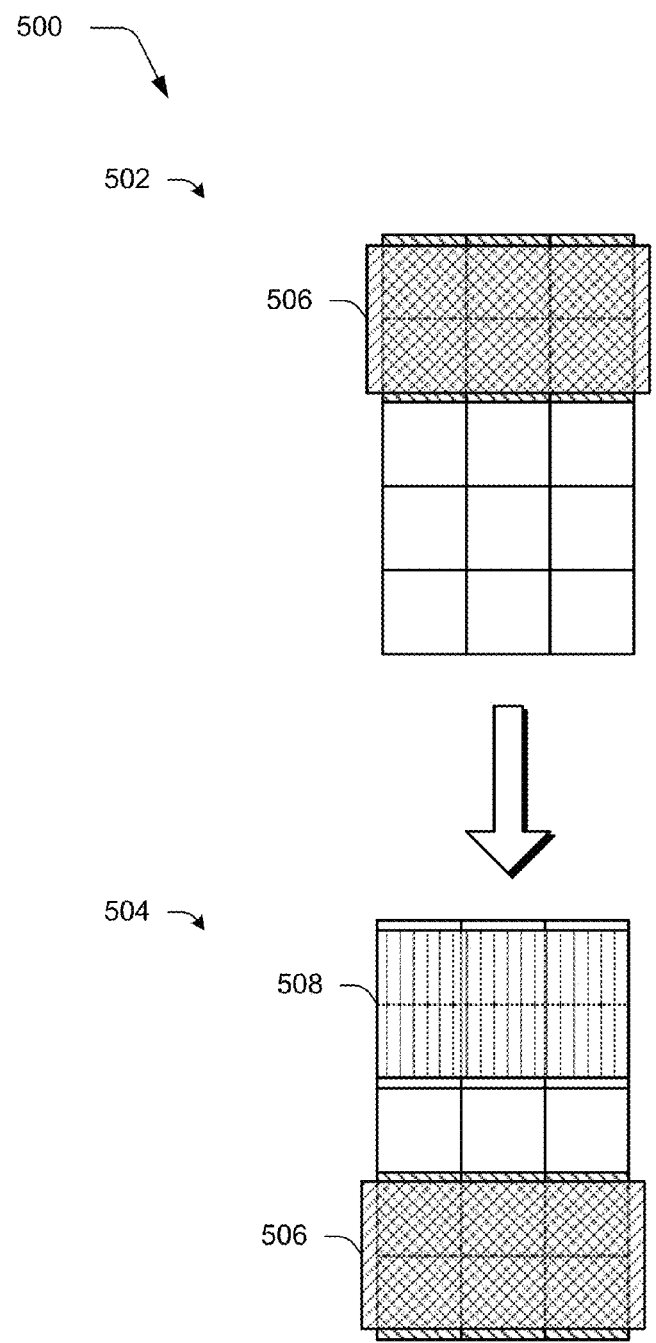
FIG. 5 depicts an example implementation in which interaction between applications and logical surfaces of a virtual surface is shown.

FIG. 5 depicts an example implementation 500 in which interaction between an applications and logical surfaces of a virtual surface is shown. This example is also illustrated through use of first and second stages 502, 504. In this example, an application's viewport 506 is shown in both the first and second stages 502, 504. Accordingly, at the first stage 502 the application initially renders to the first 6 tiles of the virtual surface (that includes 15 tiles) that are within the viewport 506, which are shown through cross-hatching.

As a page that is represented by the virtual surface is scrolled, the application may now cause the last six tiles to be rendered as shown in the second stage 504. Accordingly, the application 110 may call "trim" to indicate that the region defined by the last six tiles is currently being used and thus the rest of the content is not currently being utilized. The composition module 114 may then choose to recycle the logical surfaces 506 that originally represented the first 6 tiles.

As described above, the composition module 114 may support a variety of functionality. For example, an atlasing implementation may be hidden from the application 110 by the composition module 114 which may be used to ensure that the application 110 is to consume less than two times the surface memory for each visual.

The composition module 114 manages the allocator module 118 to perform atlas packing and surface allocation and de-allocation. The application 110 may also specify whether a visual is associated with a swap chain (e.g., for dynamic content such as video) or an atlas surface (e.g., for semi-dynamic content). The two presentation models may be supported in a single visual tree that is supported by the composition module 114.

The composition module 114 may also expose APIs 116 to create and delete logical (i.e., physical) and virtual surfaces as well as to make updates to the individual surfaces. The composition module 114 may enforce the region to be updated by the application 110 to avoid extraneous visuals when drawing outside of an updatable area.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems and example implementations of FIGS. 2-5.

Figure 6:
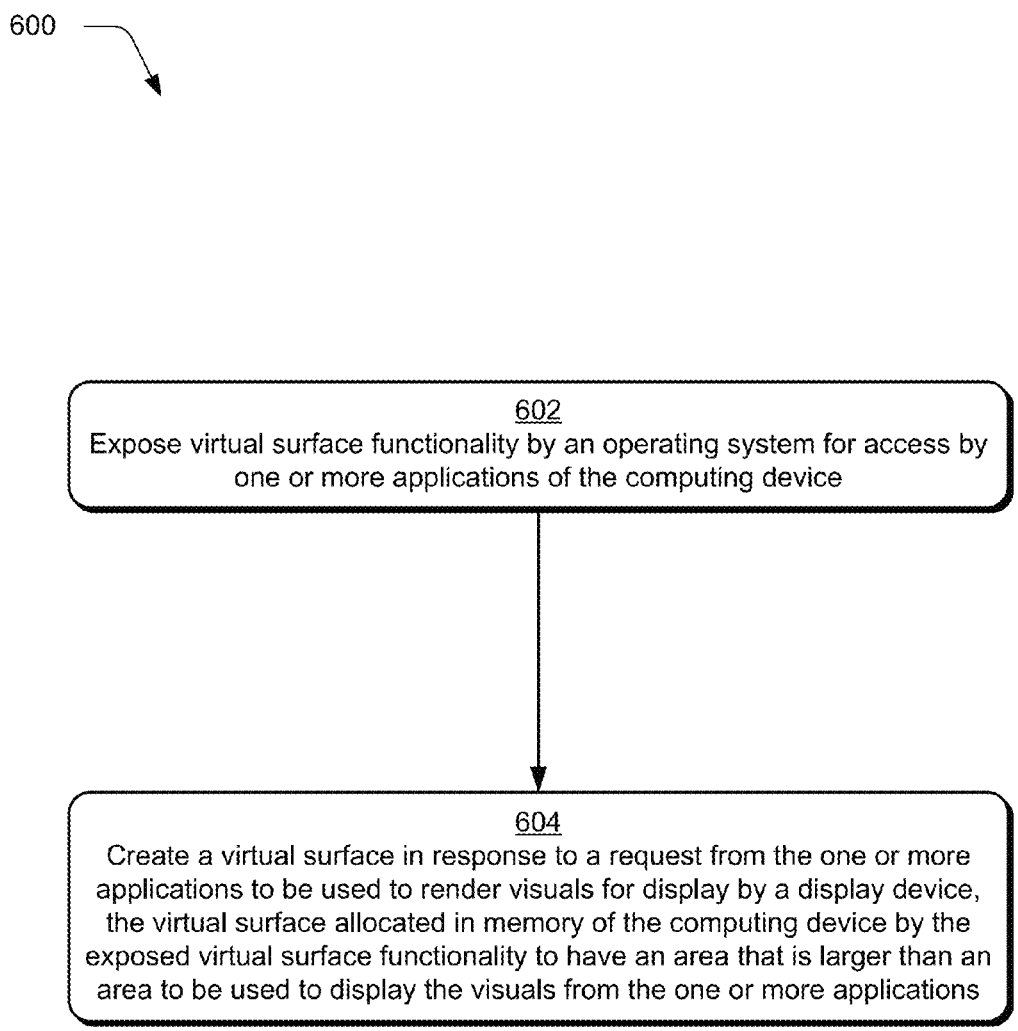
FIG. 6 is a flow diagram depicting a procedure in an example implementation in which virtual surface functionality is exposed by an operating system for access by one or more applications.

FIG. 6 depicts a procedure 600 in an example implementation in which virtual surface functionality is exposed by an operating system for access by one or more applications. A virtual surface is created in response to a request from the one or more applications to be used to render visuals for display by a display device (block 602). The composition module 114, for instance, may receive a request via an API to render a texture.

The virtual surface is allocated in memory of the computing device by the exposed virtual surface functionality to have an area that is larger than an area to be used to display the visuals from the one or more applications (block 604). As shown in FIG. 5, for instance, an area to be displayed which is represented by the viewport 506 may be smaller than an area of the virtual surface, which is represented by a plurality of logical surfaces configured as having matching sizes and arranged in a fixed grid in this example. Naturally, other examples are also contemplated.

Example System and Device

Figure 7:
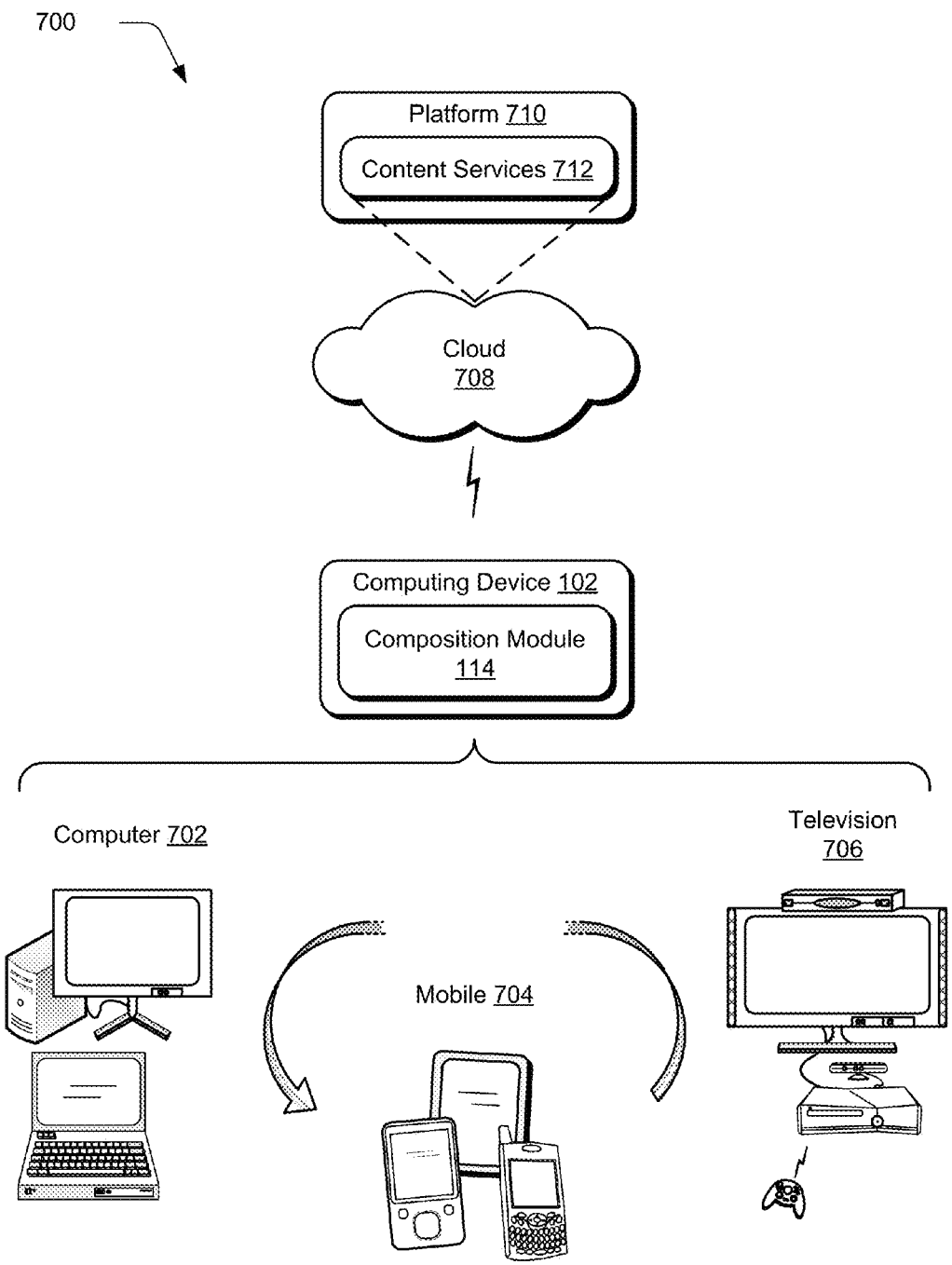
FIG. 7 illustrates an example system that includes the computing device as described with reference to FIG. 1.

FIG. 7 illustrates an example system 700 that includes the computing device 102 as described with reference to FIG. 1. The example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 702, mobile 704, and television 706 uses. Each of these configurations includes devices that may have generally different constructs and capabilities, and thus the computing device 102 may be configured according to one or more of the different device classes. For instance, the computing device 102 may be implemented as the computer 702 class of a device that includes a personal computer, desktop computer, a multi-screen computer, laptop computer, netbook, and so on.

The computing device 102 may also be implemented as the mobile 704 class of device that includes mobile devices, such as a mobile phone, portable music player, portable gaming device, a tablet computer, a multi-screen computer, and so on. The computing device 102 may also be implemented as the television 706 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein. This is illustrated through inclusion of the composition system 114 on the computing device 102, functionality of which may also be distributed "over the cloud" as further detailed below.

The cloud 708 includes and/or is representative of a platform 710 for content services 712. The platform 710 abstracts underlying functionality of hardware (e.g., servers) and software resources of the cloud 708. The content services 712 may include applications and/or data that can be utilized while computer processing is executed on servers that are remote from the computing device 102. Content services 712 can be provided as a service over the Internet and/or through a subscriber network, such as a cellular or Wi-Fi network.

The platform 710 may abstract resources and functions to connect the computing device 102 with other computing devices. The platform 710 may also serve to abstract scaling of resources to provide a corresponding level of scale to encountered demand for the content services 712 that are implemented via the platform 710. Accordingly, in an interconnected device embodiment, implementation of functionality of the functionality described herein may be distributed throughout the system 700. For example, the functionality may be implemented in part on the computing device 102 as well as via the platform 710 that abstracts the functionality of the cloud 708.

Figure 8:
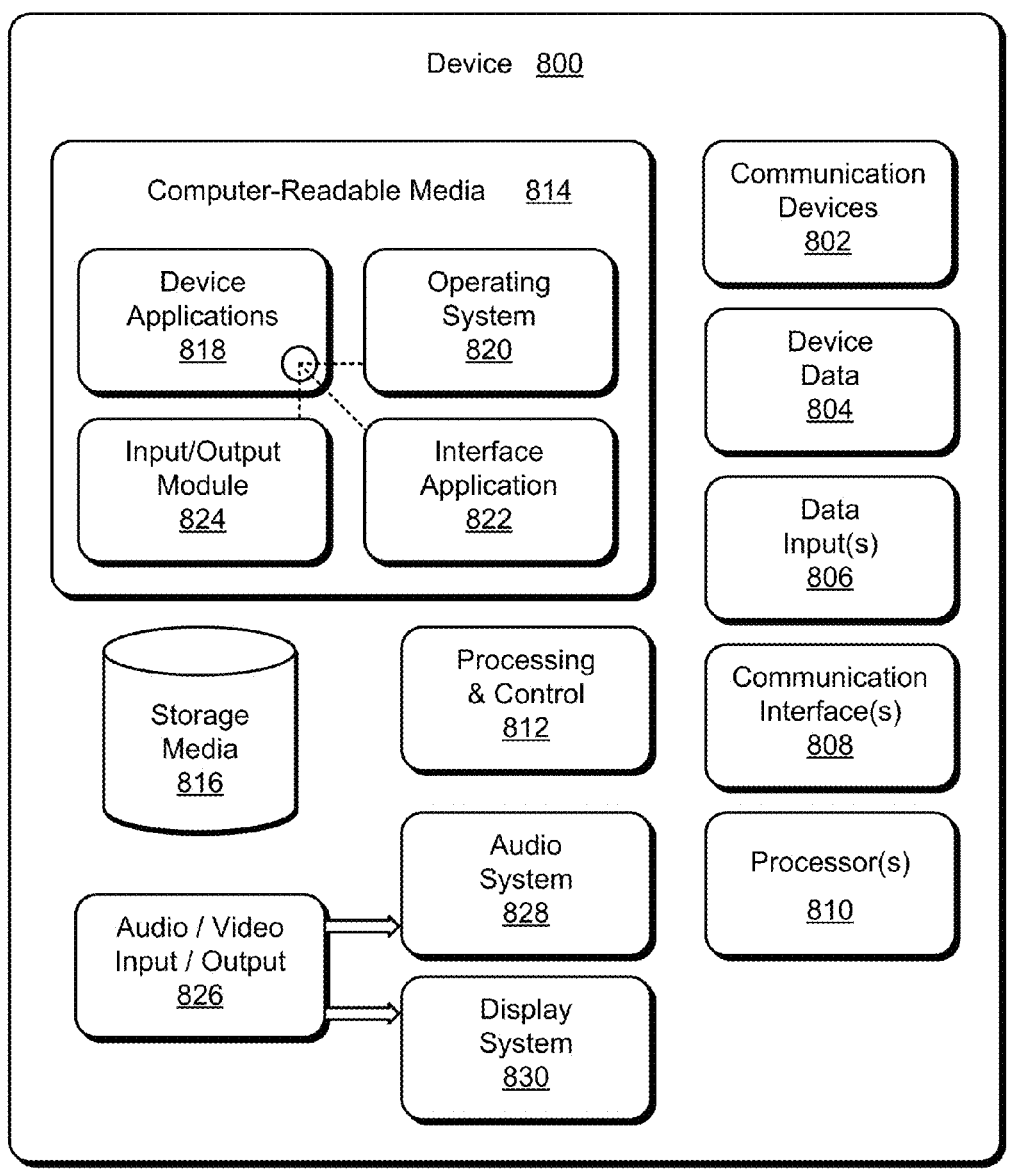
FIG. 8 illustrates various components of an example device that can be implemented as any type of computing device as described with reference to FIGS. 1 and 7 to implement embodiments of the techniques described herein.

FIG. 8 illustrates various components of an example device 800 that can be implemented as any type of computing device as described with reference to FIGS. 1, 2, and 7 to implement embodiments of the techniques described herein. Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as user-selectable inputs, messages, music, television media content, recorded video content, and any other type of audio, video, and/or image data received from any content and/or data source.

Device 800 also includes communication interfaces 808 that can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like) which process various computer-executable instructions to control the operation of device 800 and to implement embodiments of the techniques described herein. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable media 814, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable media 814 provides data storage mechanisms to store the device data 804, as well as various device applications 818 and any other types of information and/or data related to operational aspects of device 800. For example, an operating system 820 can be maintained as a computer application with the computer-readable media 814 and executed on processors 810. The device applications 818 can include a device manager (e.g., a control application, software application, signal processing and control module, code that is native to a particular device, a hardware abstraction layer for a particular device, etc.). The device applications 818 also include any system components or modules to implement embodiments of the techniques described herein. In this example, the device applications 818 include an interface application 822 and an input/output module 824 that are shown as software modules and/or computer applications. The input/output module 824 is representative of software that is used to provide an interface with a device configured to capture inputs, such as a touchscreen, track pad, camera, microphone, and so on. Alternatively or in addition, the interface application 822 and the input/output module 824 can be implemented as hardware, software, firmware, or any combination thereof. Additionally, the input/output module 824 may be configured to support multiple input devices, such as separate devices to capture visual and audio inputs, respectively.

Device 800 also includes an audio and/or video input-output system 826 that provides audio data to an audio system 828 and/or provides video data to a display system 830. The audio system 828 and/or the display system 830 can include any devices that process, display, and/or otherwise render audio, video, and image data. Video signals and audio signals can be communicated from device 800 to an audio device and/or to a display device via an RF (radio frequency) link, S-video link, composite video link, component video link, DVI (digital video interface), analog audio connection, or other similar communication link. In an embodiment, the audio system 828 and/or the display system 830 are implemented as external components to device 800. Alternatively, the audio system 828 and/or the display system 830 are implemented as integrated components of example device 800.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   exposing virtual surface functionality and hiding atlasing functionality while exposing, via application programming interfaces, methods for updating visuals by an operating system for access by one or more applications of the computing device;
   creating a virtual surface in response to a request from the one or more applications to be used to render visuals for display by a display device, the virtual surface allocated in memory of the computing device by the exposed virtual surface functionality to have an area that is larger than an area to be used to display the visuals from the one or more applications; and
   decreasing, via the exposed atlasing functionality, a number of surfaces created for the one or more applications to be used to render the visuals for display by the display device.

2. A method as described in claim 1, wherein:
   the virtual surface is configured for access by a plurality of said applications; and
   the virtual surface functionality includes an ability to specify an area of the virtual surface to be used by respective said application to render a visual in which that area is configured to restrict another said application from accessing the area to render visuals.

3. A method as described in claim 1, wherein the virtual surface is comprised of a plurality of logical surfaces, each being representative of individual surfaces including respective one or more visuals as specified by the one or more applications.

4. A method as described in claim 3, wherein the plurality of logical surfaces have a fixed size and are arranged in a fixed grid.

5. A method as described in claim 3, wherein the virtual surface functionality includes functionality to create, update, and delete the logical surfaces.

6. A method as described in claim 1, wherein the exposed virtual surface functionality includes functionality to break a surface of visual data received from the one or more applications into logical surfaces.

7. A method as described in claim 1, wherein the exposed virtual surface functionality includes functionality to render one or more of the logical surfaces before a request is received to display the one or more logical surfaces.

8. A method as described in claim 1, wherein the virtual surface, when initially created, is not backed by actual allocations from the one or more applications.

9. A method as described in claim 1, wherein the area specified by the application is to render a texture.

10. A computing device comprising one or more modules implemented at least partially in hardware and configured to perform operations comprising:
    exposing virtual surface functionality and atlasing functionality by an operating system for access by a plurality of applications of the computing device;
    creating a virtual surface, which, when initially created, is not backed by actual allocations from the one or more applications, in response to a request from one or more of the plurality of applications to be used to render visuals for display by a display device, the virtual surface allocated in memory of the computing device by the exposed virtual surface functionality to have an area that is larger than an area to be used to display the visuals from the one or more applications, the virtual surface functionality further includes an ability to specify an area of the virtual surface to be used by respective said application to render a visual in which that area is configured to restrict another said application from accessing the area to render visuals;
    determining from the request whether the visuals are associated with a swap chain or an atlas surface and using a same visual tree to support the swap chain and the atlas surface; and
    decreasing, via the exposed atlasing functionality, a number of surfaces created for the plurality of applications to be used to render the visuals for display by the display device.

11. A computing device as described in claim 10, wherein the virtual surface is comprised of a plurality of logical surfaces, each being representative of individual surfaces including respective one or more visuals as specified by the plurality of applications.

12. A computing device as described in claim 11, wherein the plurality of logical surfaces have a fixed size and are arranged in a fixed grid.

13. A computing device as described in claim 11, wherein the virtual surface functionality includes functionality to create the logical surfaces.

14. A computing device as described in claim 10, wherein the exposed virtual surface functionality includes functionality to break a surface of visual data received from the plurality of applications into logical surfaces.

15. A computing device as described in claim 10, wherein the exposed virtual surface functionality includes functionality to render one or more of the logical surfaces before a request is received to display the one or more logical surfaces.

16. A computing device as described in claim 10, wherein the area specified by the application is to render a texture.

17. A computing device as described in claim 10 wherein the atlasing functionality is hidden from the plurality of applications.

18. A computing device comprising one or more modules implemented at least partially in hardware and configured to perform operations comprising:
    exposing virtual surface functionality and hiding atlasing functionality while exposing, via application programming interfaces, methods for updating visuals by an operating system for access by one or more applications of the computing device;
    creating a virtual surface in response to a request from the one or more applications to be used to render visuals for display by a display device, the virtual surface allocated in memory of the computing device by the exposed virtual surface functionality to have an area that is larger than an area to be used to display the visuals from the one or more applications; and
    decreasing, via the exposed atlasing functionality, a number of surfaces created for the one or more applications to be used to render the visuals for display by the display device.

19. A computing device as described in claim 18, wherein:
    the virtual surface is configured for access by a plurality of said applications; and
    the virtual surface functionality includes an ability to specify an area of the virtual surface to be used by respective said application to render a visual in which that area is configured to restrict another said application from accessing the area to render visuals.

20. A computing device as described in claim 18, wherein the virtual surface is comprised of a plurality of logical surfaces, each being representative of individual surfaces including respective one or more visuals as specified by the one or more applications.

* * * * *